No. 743,481. PATENTED NOV. 10, 1903.
G. W. GARDNER.
ANTIFRICTION BEARING FOR WAGON REACHES.
APPLICATION FILED FEB. 24, 1903.
NO MODEL.
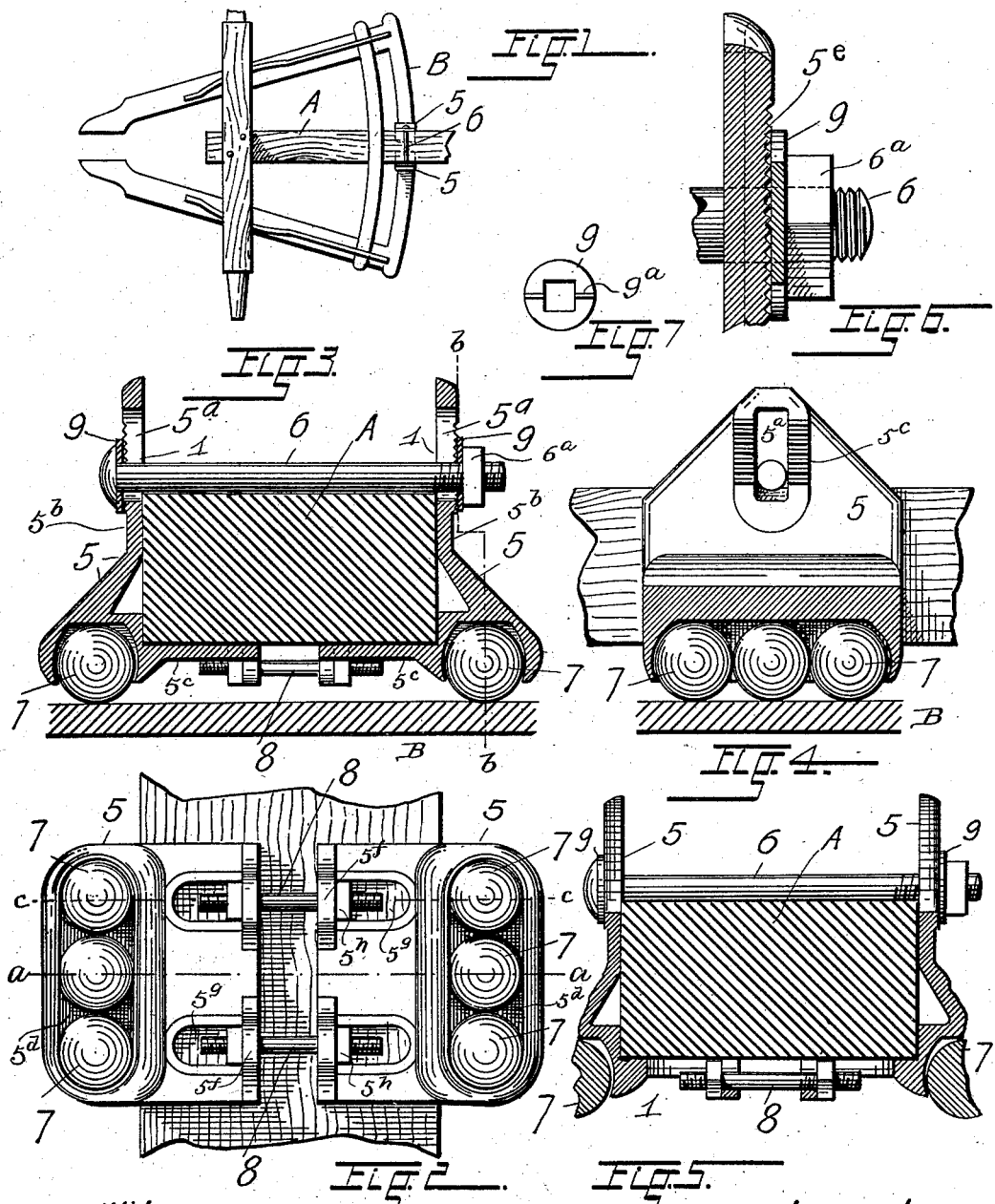

No. 743,481.

Patented November 10, 1903.

UNITED STATES PATENT OFFICE.

GEORGE W. GARDNER, OF DENVER, COLORADO.

ANTIFRICTION-BEARING FOR WAGON-REACHES.

SPECIFICATION forming part of Letters Patent No. 743,481, dated November 10, 1903.

Application filed February 24, 1903. Serial No. 144,916. (No model.)

*To all whom it may concern:*

Be it known that I, GEORGE W. GARDNER, of Denver, in the county of Arapahoe, State of Colorado, have invented a new and Improved Adjustable Antifriction Ball-Bearing Wagon-Reach; and I do hereby declare that the following is a complete and exact description of the same.

My invention is an improved adjustable antifriction ball-bearing wagon-reach; and it consists in the construction and combination of devices hereinafter described and claimed.

One object of my invention is to provide a frame of improved construction which is adapted to be detachably secured to a wagon-reach of any size and to carry antifriction devices to operate on the sway-bar of the front hounds or on a fifth-wheel to reduce friction between the reach and the sway-bar or fifth-wheel and prevent wear of the reach.

A further object of my invention is to provide improved means for attaching the frame to a wagon-reach and for adjusting it as may be required to adapt it to fit on the wagon-reach.

In the accompanying drawings, Figure 1 is a top plan view of a portion of the front truck of the wagon-gear, showing a portion of the reach and showing the sway-bar of the front hounds on which my improved adjustable frame and antifriction devices operate. Fig. 2 is a detail inverted plan view of the frame and the antifriction devices, showing the frame attached to a reach. Fig. 3 is a transverse sectional view of the same, taken on the plane indicated by the line $a\,a$ of Fig. 2. Fig. 4 is a similar view, taken on the plane indicated by the line $b\,b$ of Fig. 3. Fig. 5 is a detail sectional view, taken on the plane indicated by the line $c\,c$ of Fig. 2. Fig. 6 is a detail sectional view, on a somewhat larger scale, showing one end of the upper clamping-bolt, a portion of one section of the frame, and the nut and washer on the clamping-bolt. Fig. 7 is a detail view of the washer.

In the embodiment of my invention I provide a frame 1, which comprises a pair of side sections 5, each of which is of the form here shown, has a side flange $5^b$ to bear against one side of a reach A, a base-flange $5^c$ to bear against the under side of the reach, and a longitudinal recess or seat $5^d$ on its under side adapted to receive a plurality of antifriction-balls 7, which are adapted to turn or revolve in the said seat and to bear on the upper side of the sway-bar B, as shown in Figs. 1, 3, and 4, or to bear on the upper side of a fifth-wheel, as the case may be.

Each side flange of each frame-section 5 is provided with a vertical centrally-disposed adjusting-slot $5^a$ and on its outer side, at the sides of the said slot, with a series of serrations $5^e$. A clamping-bolt 6 serves to connect the side flanges of the frame-sections and to bear on the upper side of the reach. Said clamping-bolt extends through the adjusting-slots $5^a$ and carries washers 9, which are provided on their inner sides, opposed to the frame-sections, with tongues or serrations $9^a$, adapted to engage the serrations $5^e$ of the frame-sections. The head of the bolt bears against the outer side of one of these washers, and the nut $6^a$ bears against the outer side of the other washer, and when the nut is tightened on the bolt to clamp the vertical flanges of the side or frame sections firmly against opposite sides of the reach the coengaging serrations $5^e\,9^a$ of the said sections and the said washers serve to lock the bolt firmly against casual displacement, as will be understood. The slots $5^a$ admit of the required vertical adjustment of the bolt 6 to enable the sections of the frame 1 to be applied to reaches which vary in vertical extent.

The lower flanges $5^c$ of the frame-sections 5 are provided near their ends with depending lugs $5^f$ and are provided on the inner sides of the said lugs with recesses $5^g$. Adjusting-bolts 8, of which two are here shown as employed, connect the said flanges $5^c$ together, the said bolts passing through openings with which the lugs $5^f$ are provided, and the nuts $5^h$ of the said bolts being disposed in the recesses $5^g$, which serve to lock them against casual movement on the bolts. It will be understood that by the provision of the flanges $5^c$, which bear against the under side of the reach, and by the provision of the bolts 8, which adjustably connect the said flanges together, the space between the side or vertical flanges of the sections 5 may be varied in width, according to that of the reach to which the frame 1 is secured. Hence the frame may be firmly secured to a reach of any size.

The balls 7 bear on the sway-bar or fifth-wheel of the vehicle, reduce friction between the same and the frame 1, and entirely prevent wear of the reach, as will be understood.

Having thus fully described my invention, what I claim as new, and desire to secure by Letters Patent, is—

1. A frame comprising a pair of sections having base-flanges to bear against the under side of a reach, and side flanges to bear against the sides of a reach, said side flanges having vertical adjusting-slots, adjusting-bolt connecting the side flanges together and disposed in said adjusting-slots, said bolt being adapted to bear on the upper side of the reach, adjusting-bolts adjustably connecting the base-flanges together under the reach, and anti-friction devices on the under sides of the said frame-sections, substantially as described.

2. A frame having side flanges to bear against the sides of a reach and provided with adjusting-slots and locking-serrations, anti-friction devices carried by the frame for the purpose set forth, a bolt to connect the frame-sections together, and extending through the adjusting-slots and locking-washers on the said bolt having locking-serrations coacting with those of the frame-sections, to prevent vertical movement of the bolt, substantially as described.

GEORGE W. GARDNER.

Witnesses:
   JOHN A. McINTYRE,
   JOHN T. RICE.